US007698278B2

(12) United States Patent
Drepper

(10) Patent No.: US 7,698,278 B2
(45) Date of Patent: Apr. 13, 2010

(54) METHOD AND SYSTEM FOR CACHING DIRECTORY SERVICES

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 736 days.

(21) Appl. No.: 10/931,023

(22) Filed: Aug. 31, 2004

(65) Prior Publication Data
US 2006/0075059 A1 Apr. 6, 2006

(51) Int. Cl.
*G06F 17/30* (2006.01)
(52) U.S. Cl. ...................................................... 707/10
(58) Field of Classification Search .............. 707/104.1, 707/2, 8, 10, 201, 203, 103, 202; 711/128, 711/3, 124, 118, 133, 120, 144; 364/490; 395/200.31
See application file for complete search history.

(56) References Cited

U.S. PATENT DOCUMENTS

| | | | | |
|---|---|---|---|---|
| 5,893,155 | A * | 4/1999 | Cheriton | 711/144 |
| 6,154,749 | A * | 11/2000 | Aravamudan et al. | 707/104.1 |
| 6,157,925 | A | 12/2000 | Jenkins et al. | |
| 6,262,987 | B1 | 7/2001 | Mogul | |
| 6,647,393 | B1 * | 11/2003 | Dietterich et al. | 707/102 |
| 2001/0013089 | A1 * | 8/2001 | Weber | 711/146 |
| 2002/0059191 | A1 * | 5/2002 | Tamura | 707/2 |
| 2002/0062401 | A1 | 5/2002 | Auslander et al. | |
| 2002/0073167 | A1 * | 6/2002 | Powell et al. | 709/217 |
| 2002/0087797 | A1 * | 7/2002 | Adrangi | 711/133 |
| 2004/0167941 | A1 * | 8/2004 | Prahlad et al. | 707/204 |
| 2004/0267832 | A1 * | 12/2004 | Wong et al. | 707/200 |

OTHER PUBLICATIONS

M. Arthur Munson, Caching and the Java Virtual Machine, Williams College, May 14, 2001, pp. 1-191 (only pp. 4, 11, 22, and 29 has been provided).*
Janakiraman et al., 13th Symposium on Reliable Distributed Systems, 1994, Oct. 1994, pp. 42-51, Meeting Date: Oct. 25-27, 1994.*
Reinhardt et al., ACM SIGMETRICS Performance Evaluation Review archive, vol. 21, Issue 1 (Jun. 1993), pp. 48-60.*
Agarwal et al, Computer Architecture, 1988. Conference Proceedings, 15th Annual International Symposium, May 30-Jun. 2, 1988, pp. 280-289.*
Bershad et al, Compcon Spring '93, Digest of Papers, Feb. 22-26, 1993, 528-537.*
Hecht et al., Parallel and Distributed Processing Symposium, 2003. Proceedings International, Apr. 22-26, 2003, 8 pp.*

(Continued)

*Primary Examiner*—Cheyne D Ly
(74) *Attorney, Agent, or Firm*—Wilmer Cutler Pickering Hale and Dorr LLP

(57) ABSTRACT

A computing device includes a local directory service cache. The local directory service cache is a live database. The directory service cache is stored in a shared memory space. In certain embodiments of the invention, client processes needing directory services can directly access the local directory service cache via memory mapping. A caching program updates and maintains the database and obtains the needed data if a cache miss is encountered. Some socket communications between the client processes and the caching program may be used to update database entries, notify the caching program of cache misses, etc.

17 Claims, 3 Drawing Sheets

OTHER PUBLICATIONS

Thapar et al., ACM, pp. 114-119, 1990.*
A.S. Tanenbaum, "Modern Operating Systems, 2nd edition" pp. 44-53 and 100-103 (2001).
European Search Report for EP Application No. EP 05 25 5320 dated Feb. 24, 2006.
Munson, M. Arthur. "Catching and the Java Virtual Machine." Williams College, May 14, 2001. pp. 1-191 (only 4, 11, 22 and 29 have been provided).
International Search Report for International Application No. PCT/US05/31436 mailed Jun. 26, 2008.

* cited by examiner

METHOD AND SYSTEM FOR CACHING DIRECTORY SERVICES

FIELD OF THE INVENTION

This invention relates to techniques for providing directory services in a distributed computing system and more particularly to techniques for sharing cached data from directory services.

BACKGROUND OF THE INVENTION

Computer systems typically include two or more computers networked together to allow the sharing of applications, resources, services and information by a number of users. Applications running in this de-centralized environment need information about the system from time to time, including, for example, information about users, host name resolution, passwords, and file system mount points. Typically, a network service known as a "directory service" (traditionally, also "name service") is used to store, maintain, and provide this information to client programs in the system. A directory service typically keeps track of all resources on a network and makes this information available to users and applications. For example, when a user logs on, the login program on the local computer may communicate with the directory service to check the user's password or other authentication information. The local computer may further communicate with the directory service to obtain information about the user's permissions in the network.

A directory service includes a database where the directory data is stored, as well as programs for administering the database and programs for communicating with client applications. The directory service may be implemented on one or more servers on the network. A process is a running instance of a program. Typically, processes requiring directory services call a look-up function to access the requisite directory information. The look-up function may be included in a C library of standard functions that are available in the system. In some systems, the look-up function involves making a request directly to the remote directory server over the network using conventional protocol-based communications. The directory server receives the request, looks up the requested data in the database, and transmits a response to the client process. Directory service requests between the client and the directory service are costly in terms of network resources. This type of communication requires active participation by both the requesting client and the responding directory server. The directory server receives the requests over a dedicated socket or port and must constantly be checking for communications over that port. Additionally, a number of client requests in a short period of time can overload the directory server. The response time may become unacceptable or the server may even crash. If the directory services are implemented on the main network server, the whole network may come to a halt. Accordingly, reliance on a centralized, server-based directory service can result in slow operation or total network failure during periods of heavy use. The directory service response time may not be within acceptable limits, for example due to a backlog of requests, or network delays. This problem increases as the size of the network and the number of processes running on the system increase. Making requests of the directory service can also be inefficient because the same data is often accessed repeatedly.

One solution to the problem of providing directory services efficiently involves caching the retrieved data locally on one or more machines, so that after a first lookup of particular data from the directory server by a caching program, all local processes can retrieve that data locally by communicating with the caching program. After the initial access, for each subsequent access of that particular data, the necessary communication is restricted to local inter-process communication between the requesting process and the caching program. This local communication is faster than communication with a directory server over a network. This technique suffers from the drawback that the operating system has to perform a number of potentially costly operations: the request must be transmitted from process to process, the caching program must be given the opportunity to run and produce the result, and the result must be provided to the requesting process. This may slow down the other processes running on the system. The centrally-managed cache may still be a bottleneck.

SUMMARY OF THE INVENTION

The invention provides methods and systems for implementing a directory services cache on a computing device. In certain embodiments of the invention, a locally cached directory services database can be accessed directly by client processes needing directory services. A caching program updates and maintains the database and obtains the needed data if a cache miss is encountered. In certain embodiments of the invention, inter-process communications are not used to obtain data already contained within the cache. Some inter-process communications between the client processes and the caching program may be used to update database entries, notify the caching program of cache misses, etc.

At least the portion of the cache in which the directory services database is stored in a shared memory space. In certain embodiments of the invention, to maintain the integrity of the database, only the caching program is able to read and write to the database. The database is read-only with respect to client processes.

In certain embodiments of the invention, the database is implemented without using pointers, in order to support the sharing of the memory space by different processes. In certain embodiments of the invention, the database is implemented using address offsets.

In certain embodiments of the invention, the locally cached directory services database is a live database. In certain embodiments of the invention, the database entries are updated at regular intervals. Entries in the database expire after a certain period of time and are discarded if they have not been used recently. In certain embodiments of the invention, the caching program includes automatic garbage collection to reclaim unused memory in the cache from time to time.

The caching implementation is preferably hidden from the application programs on the computing device. In certain embodiments of the invention, the implementation is handled by adding modified directory service functions to the C library that interact with the caching program and the locally cached directory services database as described herein.

DETAILED DESCRIPTION OF THE DRAWINGS

Figure 1:
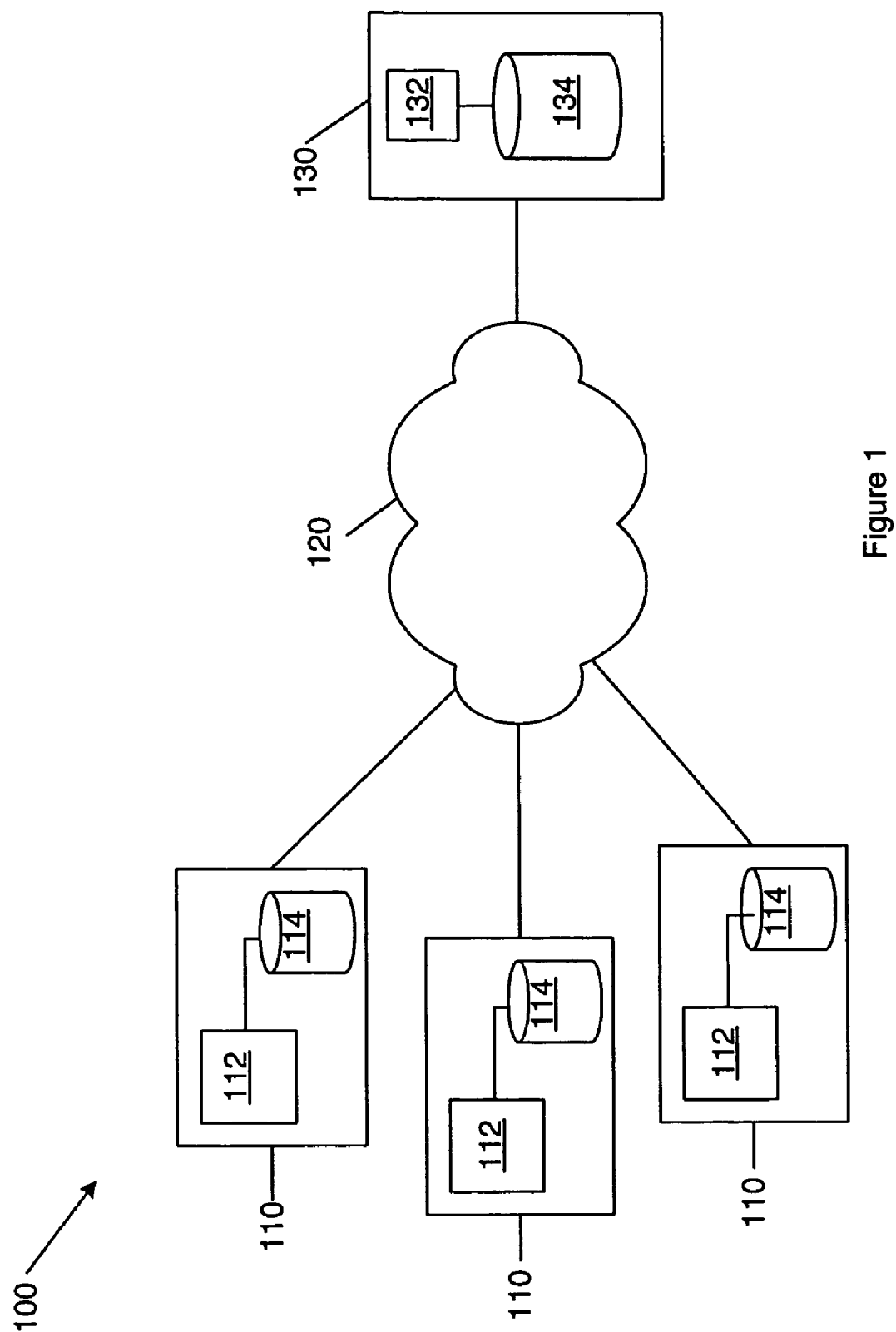
FIG. 1 is a block diagram illustrating an example of a networked computer system in which a directory services caching capability may be implemented in accordance with embodiments of the invention.

FIG. 1 is a block diagram illustrating an example of a networked computer system 100. Networked computer system 100 includes a plurality of computing devices 110 interconnected via a data communications network 120. The computing devices 110 may include personal computers, laptops, personal digital assistants, cellular phones, etc. Each computing device 110 includes, among other components, a processing unit 112 and a number of memory storage devices 114. In typical cases, storage devices 114 include, for example, any type of permanent or semi-permanent storage (e.g., hard disc drives, memory cards, and the lie) and may be used to store any number of software programs or data files. On one or more of computing devices 110, storage device 114 also includes a shared memory space, at least a portion of which is used to store a directory service database, discussed further below. An operating system installed on each computing device 110 provides direct control and management of hardware and basic system operations and application programs.

As shown in FIG. 1, computing devices 110 may be linked to a server system or server 130 via a data communication network 120 to facilitate the transmission of information and data between computing devices 110 and server 130. Examples of network 120 may include the Internet or other similar data networks, such as private WANs, LANs and the like.

In the embodiment of FIG. 1, server 130 may represent, for example, a network server. Server 130 includes, among other components, a processing unit 132 and a number of storage devices 134. Server 130 supports a directory service and includes a directory service program and a database of directory information stored in storage devices 134. The directory service may offer a number of types of services, such as user information, group information, host name information, file system mount point information and more. The directory service may be implemented according to a number of directory service protocols such as LDAP, Hesiod, NIS, etc. The directory service may be implemented using known directory service packages, such as OpenLDAP. The directory service may also be implemented using multiple directory service platforms and may be compatible with a number of communication protocols. The directory service program has several functions. It continuously maintains and updates the database. The directory service program also handles requests for directory services, i.e., for directory information. A typical request is received over the network via a standard communication protocol. The directory service program queries the database for the requested directory information and communicates the result back to the requesting client. The complete process of obtaining directory information entails two-way communication between a requesting client and the directory service program.

In preferred embodiments of the invention, one or more of computing devices 110 in computer system 100 include a directory service caching capability. In certain embodiments of the invention, each computing device on a network that may require directory service has a local directory services cache. In various embodiments, the caching capability improves the overall efficiency of providing directory services and optimally yields improved average response times to directory service requests. The caching capability has two primary components, a directory service database or cache, where the data is stored, and a directory service caching program that manages the database. In preferred embodiments of the invention, the directory service cache is stored in a shared memory address space. The database stores directory information in a structured way so that it can be accessed using appropriate search keys. The database is maintained in real-time and the live data is preferably made directly accessible via the shared memory space to all processes that may invoke the directory service. The directory service cache implementation is based on a sharing model, which requires that only one party to a transfer of information be actively involved, rather than a communication model, which requires both parties to a transfer of information to be actively involved. As discussed below, this technique allows the number of communications needed to provide directory services to be reduced.

In preferred embodiments, the details of how directory service requests are handled, including the implementation of the caching capability, are completely hidden from application programs. A C library is an aspect of an operating system. It is a library of functions defined for system calls and other basic facilities in the system. A system call is the mechanism used by an application program to request service from the operating system. In preferred embodiments, the client process merely makes a function call to a look-up function in the C library in order to request directory information. The function handles all of the steps necessary for obtaining the directory information, including accessing the cache and/or communicating with the caching program. Changes to the implementation can be made in a centralized fashion by updating the code for the function in the C library.

Figure 2:
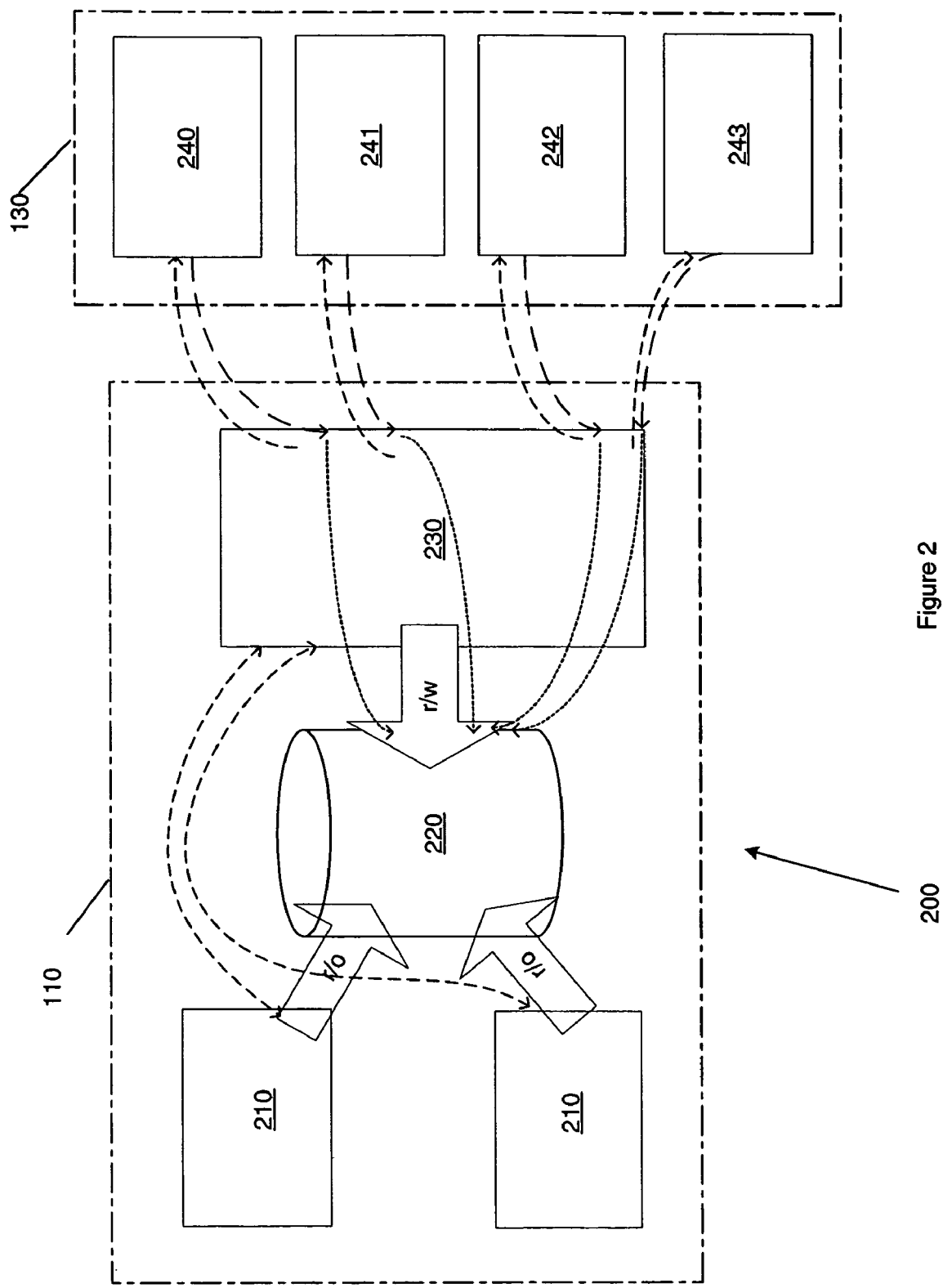
FIG. 2 is a schematic illustration of interactions between various components involved in implementing a directory services cache in accordance with certain embodiments of the invention.

FIG. 2 shows a schematic 200 of the interactions between various components used to provide directory service in some embodiments of the present invention. The dashed box numbered 110 indicates that the illustrated components are contained within one of computing devices 110. The dashed box numbered 130 indicates that the illustrated components are contained within server 130. The interactions within the computing device 110 involve one or more client processes 210, a database caching program 230 and a directory services database or cache 220. The interactions within the computing device 110 may also involve the operating system. In certain embodiments, the directory services database 220 is stored as a file. The database 220 is continuously updated by the caching program 230. The caching program 230 also functions as an intermediary preferably to handle all communication with the directory server 130 and especially to handle cache misses for client processes 210.

Figure 3:
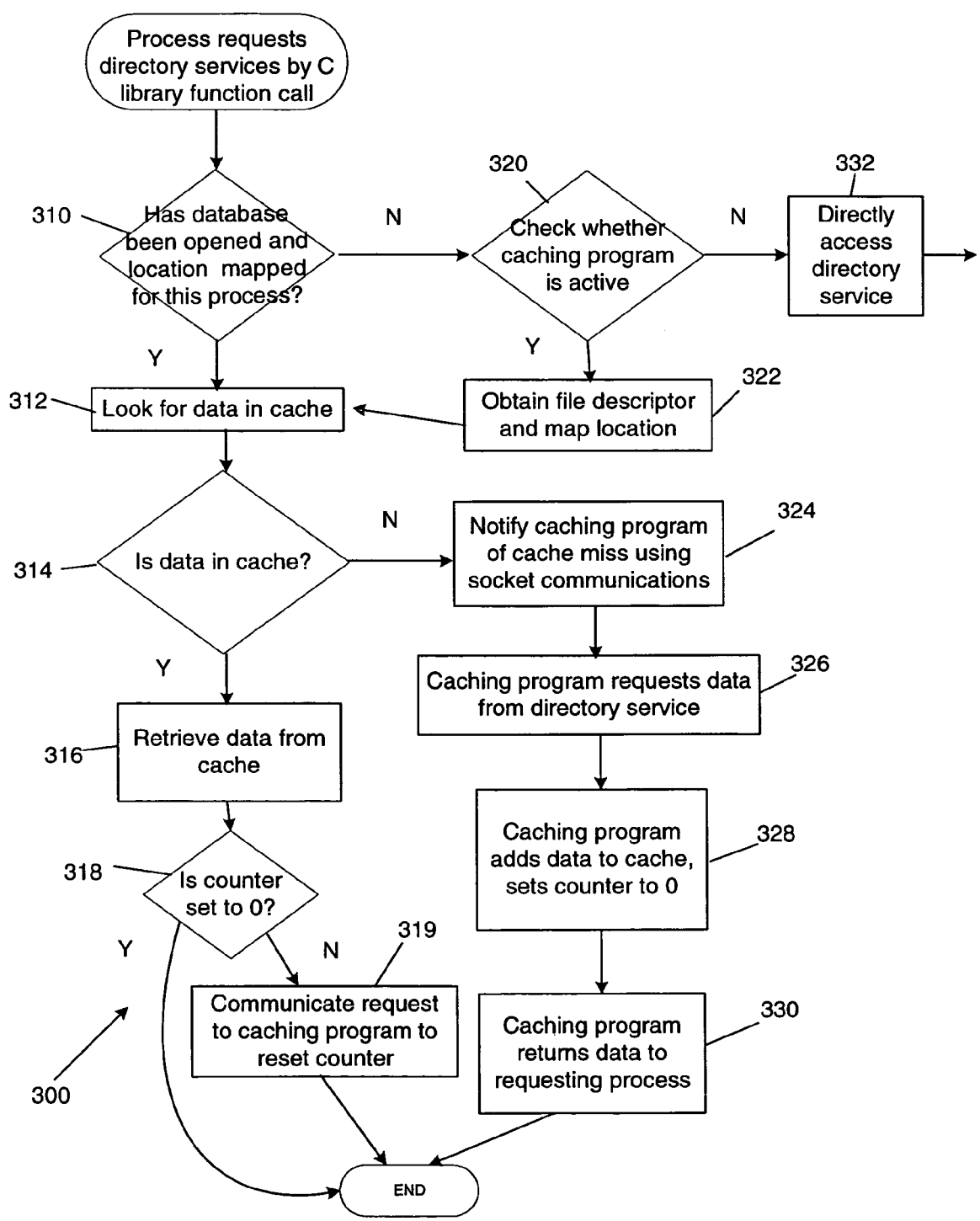
FIG. 3 is a flow diagram of one method for using a directory services cache in accordance with certain embodiments of the invention.

The process 300 for handling a directory service request is shown in FIG. 3. In preferred embodiments of the invention, when a process 210 running on computing device 110 makes the appropriate function call, if the database location for this process 210 has already been initialized, the cache access can proceed (Step 310). If not, the first step is to determine whether the caching program 230 is running (Step 320). This is detected if the appropriate socket is open and connected to an active process. If the caching program 230 is not running, then the request is made directly to the remote directory server 130 (Step 332, subsequent steps not shown) by the client process 210. If the caching program 230 is running, in an initialization step, if this is the first time this client process 210 has accessed the directory service, the directory service cache 220 is made accessible to the process 210. Only the caching program 230 can open the file where the directory services information is stored. The caching program 230 uses a system call to provide the file descriptor to the client process 210. The client process 210 maps the directory services cache file 220 into its address space (Step 322). In certain embodiments, the file containing the database 220 is mapped into memory using the mmap system call.

For subsequent directory services, the process 210 already has access to the directory services cache 220 and need not go through this step. In some exceptional cases, the caching program 230 may have abandoned the cache file and started a new one. A client process 210 must recognize that the old files are abandoned, unmap the old file, and request a new file descriptor.

Once the directory file 220 is available to the client process 210, it searches the database 220 for the desired information (Step 312). If the data is located in the cache 220 (Step 314), then the client process 210 retrieves the data (Step 316) and the directory services requirement is fulfilled without accessing the remote directory server 130 and also without local interprocess communications. Thus, the likelihood of bottlenecks due to the directory server 130 and due to interprocess communications is reduced.

If the data is not located in the cache 220 (Step 314), additional steps must be taken to obtain the data from the remote directory server 130. The caching program 230 functions as an intermediary between the client process 210 and the directory server 130. The client process 210 communicates with the caching program 230 via socket communications to notify it of a cache miss (Step 324). The caching program 230 obtains the requested information from the directory server 130 (Step 326) and puts the data into the mapped database 220 (Step 328) so that it is immediately available to all clients 210 without socket communications. The data retrieved from the remote directory server 130 is provided back to the requesting client process 210 via the socket connection to the caching program 230 (Step 330).

Different processes are able to map the database 220 into their address space simultaneously. In certain embodiments of the invention, only the caching program 230 is able to read and write to the database 220. The client processes 210 have direct and unsupervised read-only access to the database 220.

In preferred embodiments, in the implementation of the cache 220, address offsets are used for addressing all objects. This technique avoids complications that can arise while using pointers in a shared memory space. Periodic garbage collection is used to maintain the directory services database 220. The size of the cache 220 is limited. Obsolete entries are removed using garbage collection techniques to make room for new entries.

The directory service database 220 is a live database and the cache is preferably kept up-to-date. In preferred embodiments, every entry in the database 220 has a time-to-live. The time-to-live determines how long that data is kept in the cache 220 before it expires. When the time-to-live expires, the caching program 230 checks how useful the entry has been. Each entry has a counter associated with it that tracks accesses of that entry. The caching program 230 may track and check whether the entry was accessed since it was last loaded or how many times it has been loaded without being used. If it was accessed a sufficient number of times or sufficiently recently, the entry is automatically reloaded by the caching program 230. If it was not accessed or not accessed a sufficient number of times or sufficiently recently, the entry may be discarded, and the memory occupied by the discarded entries become available for new entries to be loaded. An entry that has vanished from the cache 220 is looked up from the directory server 130 by the caching program 230 when a cache miss is detected. In certain embodiments, each entry has a counter associated with it. The counter tracks how many times the entry has been reloaded since it was last used. If the counter reaches a certain value, the entry is discarded. The counter is reset to 0 when an entry is used. If the entry is already 0, then it does not need to be reset and this step can be avoided. It is only necessary to acknowledge a database entry once after every reload. In order to keep the database 220 current, when the client process 210 uses a cache entry, it checks the status of the entry; i.e., it checks whether the counter is set to 0 (Step 318). If the counter is set to 0, then the look-up is complete and the entire directory service request is fulfilled without any interprocess communications. If the counter is not set to 0, client process 210 communicates with the caching program 230 via socket communications or other interprocess communication to update the counter for that entry (Step 319). This acknowledgement can be accomplished using a one-way communication. In preferred embodiments, a client process 210 can only reset the counter by making a request to the caching program 230 to do so because it does not have permission to write to the database 220. Because the client process 210 already has the data it needs and the communication is a local, one-way communication, this socket communication does not substantially delay the process activity. Thus, in various embodiments of the invention, direct access to the directory service cache via shared memory and occasional one-way and two-way communication with the caching program is typically faster than unconditional two-way communication with the caching program for every directory service look-up, which has been used traditionally. Overhead for supporting directory services is significantly reduced.

The caching program 230 can communicate with the directory server 130 using any of various protocols that may be supported. The use of a particular type of directory server or particular communication protocols is not a feature of the invention. The directory server 130 may be implemented across multiple machines or using multiple platforms, as illustrated in FIG. 2. The directory server 130 is shown as including an LDAP component 240, a NIS component 241, a Hesiod component 242, and a fourth type of component 243 that is not specified herein. LDAP (the Lightweight Directory Access Protocol) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The caching program 230 uses the appropriate communication method to request directory services from the appropriate component(s).

It will be appreciated that embodiments of the invention may be implemented using a variety of techniques in addition to the specific techniques describe herein. For example, the cache may be implemented using a variety of cache handling techniques. For example, in certain embodiments, client processes may be given write access to the mapped cache. In such embodiments, interprocess communications will not be necessary for updating cache entry usage information. Also, communication between the caching program and client processes may take place using any type of interprocess communications.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A computer-implemented method for at least one of a plurality of client processes on a computing device to obtain directory service information, comprising the steps of:
   a caching program maintaining a local directory service database within a shared memory space of the computing device, wherein the local directory service database contains the directory service information, the shared memory space is commonly read-only accessible to the plurality of client processes, and the caching program interacts with plurality of client processes to (i) selectively grant shared memory space access to the plurality of client processes and (ii) provide shared memory support functions to the client processes for which the client processes are not sanctioned to perform;
   at least one of the plurality of client processes obtaining access to the local directory service database;
   the at least one of the plurality of client processes checking the local directory service database through direct access to the shared memory space for a desired directory service information entry;
   the at least one of the plurality of client processes retrieving the desired directory service information entry if it is present in the local directory service database; and
   the at least one of the plurality of client processes notifying the caching program of a cache miss if the desired directory service information entry is not present in the local directory service database, and in response to the notifying, the caching program adding an information entry to the local directory service database and informing the at least one of the plurality of client processes of the adding.

2. The method of claim 1, wherein the local directory service database is implemented without using pointers.

3. The method of claim 2, wherein the local directory service database is implemented using address offsets.

4. The method of claim 3, wherein the caching program periodically runs a garbage collection function to maintain the local directory service database.

5. The method of claim 1, wherein the at least one of the plurality of client processes obtains read-only access to the local directory service database within the shared memory space.

6. The method of claim 1, wherein the step of the at least one of the plurality of client processes checking the local directory service database does not involve socket communications.

7. The method of claim 1, further comprising the step of detecting that a counter for the desired entry should be updated and notifying the caching program that the desired directory service information entry has been accessed.

8. A computer program product, residing on a computer readable storage medium, for use in obtaining directory service information, said computer program product comprising instructions for causing at least one of a plurality of client processes on a computer to:
   obtain access to a local directory service database maintained by a caching program and disposed in a shared memory space of the computing device, wherein the local directory service database contains the directory service information, the shared memory space is commonly read-only accessible to the plurality of client processes, and the caching program interacts with plurality of client processes to (i) selectively grant shared memory space access to the plurality of client processes and (ii) provide shared memory support functions to the client processes for which the client processes are not sanctioned to perform;
   check the local directory service database for a desired directory service information entry, without making a request to the caching program;
   retrieve the desired entry if it is present in the local directory service database; and
   notify the caching program of a cache miss if the desired directory service information entry is not present in the local directory service database.

9. The computer program product of claim 8, wherein the local directory service database is implemented without using pointers.

10. The computer program product of claim 9, wherein the local directory service database is implemented using address offsets.

11. The computer program product of claim 8, wherein the at least one of the plurality of client processes obtains read-only access to the local directory service database within the shared memory space.

12. The computer program product of claim 8, further comprising instructions for causing a computer to notify the caching program that the desired directory service information entry has been accessed.

13. The computer program product of claim 12, wherein the instructions to notify the caching program that the desired directory service information entry has been accessed use socket communications.

14. A computing system connected to a network that includes a remote directory server, comprising:
   a processor;
   a storage device;
   a directory service database including directory service information provided in a portion of said storage device, the directory service database containing local copies of one or more directory service information entries stored on the remote directory server, said portion of said storage device being read-only accessible to at least one of a plurality of client processes running on said computing system;
   a caching program capable of reading and writing to the database and including instructions for maintaining the database, for communicating with said directory server and for communicating with said at least one of the plurality of client processes, wherein the caching program interacts with plurality of client processes to (i) selectively grant shared memory space access to the plurality of client processes and (ii) provide shared memory support functions to the client processes for which the client processes are not sanctioned to perform; and
   and a directory service cache look-up function, said look-up function including instructions for obtaining one or more desired directory service information entries by accessing the database directly, said look-up function being called by said at least one of the plurality of client processes.

15. The computing system of claim 14, wherein the caching program includes garbage collection.

16. The computing system of claim 14, wherein the directory service database is implemented using address offsets.

17. The computing system of claim 14, wherein each directory service information entry in said directory service database includes a counter for tracking usage of the entry.

* * * * *